United States Patent
Tang

(10) Patent No.: US 10,304,105 B2
(45) Date of Patent: May 28, 2019

(54) SHOPPING GUIDE ROBOT SYSTEM AND CUSTOMER IDENTIFICATION NOTIFICATION METHOD OF SHOPPING GUIDE ROBOT

(71) Applicant: ECOVACS ROBOTICS CO., LTD., Suzhou, Jiangsu (CN)

(72) Inventor: Jinju Tang, Suzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 339 days.

(21) Appl. No.: 15/109,629

(22) PCT Filed: Dec. 31, 2014

(86) PCT No.: PCT/CN2014/095795
§ 371 (c)(1),
(2) Date: Sep. 7, 2016

(87) PCT Pub. No.: WO2015/101314
PCT Pub. Date: Jul. 9, 2015

(65) Prior Publication Data
US 2017/0169489 A1  Jun. 15, 2017

(30) Foreign Application Priority Data
Jan. 3, 2014 (CN) .......................... 2014 1 0003731

(51) Int. Cl.
*G06Q 30/00* (2012.01)
*G06Q 30/06* (2012.01)
*G05B 19/048* (2006.01)

(52) U.S. Cl.
CPC ....... *G06Q 30/0619* (2013.01); *G05B 19/048* (2013.01); *G06Q 30/016* (2013.01); *G06Q 30/0639* (2013.01); *G05B 2219/40243* (2013.01)

(58) Field of Classification Search
CPC ............. G06Q 30/016; G06Q 30/0639; G06Q 30/0619; G05B 2219/40243; G05B 19/048
(Continued)

(56) References Cited

U.S. PATENT DOCUMENTS 7,436,143 B2 * 10/2008 Lakshmanan ........... F41H 7/005
318/568.12
7,636,045 B2 * 12/2009 Sugiyama .............. G06Q 30/02
340/5.9
(Continued)

FOREIGN PATENT DOCUMENTS

CN  101419463 A  4/2009
CN  101436037 A  5/2009
(Continued)

OTHER PUBLICATIONS

CN Office Action dated Aug. 15, 2017 in application No. 201410003731.1.

*Primary Examiner* — Yogesh C Garg
(74) *Attorney, Agent, or Firm* — Maschoff Brennan

(57) ABSTRACT

A shopping guide robot system and an associated customer identification notification method. The system comprises the shopping guide robot and a background service terminal. A body of the shopping guide robot has a control unit, a movement unit, a communication module and a camera unit that collect images. The control unit has a customer identification module, which identifies a human face in an image and sends a first signal after determining that the human face is a customer. The control unit receives the first signal and sends a second signal to the background service terminal through the communication module. The background service terminal receives the second signal and sends a notification signal. In this manner, background personnel does not need to stare at a monitoring screen constantly to view
(Continued)

whether a customer needs to be served. A background automatically prompts whether a customer enters or needs help, reducing work strength.

14 Claims, 3 Drawing Sheets

(58) Field of Classification Search
USPC .................................. 1/1; 705/26.9, 26.44
See application file for complete search history.

(56) References Cited

U.S. PATENT DOCUMENTS

| | | | |
|---|---|---|---|
| 2004/0249510 A1 | 12/2004 | Hanson | |
| 2005/0222712 A1* | 10/2005 | Orita | G06Q 30/02 700/246 |
| 2013/0325325 A1 | 12/2013 | Djugash | |

FOREIGN PATENT DOCUMENTS

| | | | | |
|---|---|---|---|---|
| CN | 101618542 A | | 1/2010 | |
| CN | 101927490 A | | 12/2010 | |
| CN | 102059700 A | * | 5/2011 | ........... G06Q 30/016 |
| CN | 102289556 A | | 12/2011 | |
| CN | 102411368 A | | 4/2012 | |
| CN | 102411749 A | | 4/2012 | |

* cited by examiner

SHOPPING GUIDE ROBOT SYSTEM AND CUSTOMER IDENTIFICATION NOTIFICATION METHOD OF SHOPPING GUIDE ROBOT

FIELD OF THE INVENTION

The present invention relates to a shopping guide robot system and a customer identification notification method of the shopping guide robot, belonging to the technical field of manufacture of household electrical appliances.

BACKGROUND ART

The shopping guide robot is commonly used in occasions such as a shopping mall or a supermarket to provide customers with service functions such as commodities consultation and target commodities indication. Generally, the shopping guide robot is provided with a camera and sends captured images to the display screen of the background (background service terminal). The background service staff determines whether or not there is a new customer by monitoring the images on the screen. Thus, the background staff needs to constantly stare at the screen, resulting in that the eyesight of the staff is harmed and the efficiency is low. Particularly, when there are multiple shopping guide robots, the background staff has to monitor those shopping guide robots simultaneously to check whether there is a new customer or not. If the staff fails to realize the presence of a new customer in time, service satisfaction level of the customer would be decreased.

SUMMARY OF THE INVENTION

In view of the above deficiencies in the prior art, the present invention intends to provide a shopping guide robot system and a customer detection method of the shopping guide robot. With a customer prompting system, the background staff no longer needs to stare at the monitor screen all the time to check if any customer needs service, and the background system can automatically prompt that if any customer enters or needs help, reducing work strength.

The technical problem to be solved in the present application is solved by the following technical solutions.

A shopping guide robot system comprising: a shopping guide robot and a background service terminal, wherein a body of the shopping guide robot is provided with a control unit, a movement unit, a communication module and a camera unit for capturing images. The control unit is provided with a customer identification module used to identify faces in an image, and the customer identification module sends a first signal after identifying that a face is a customer's face. The control unit receives the first signal and sends a second signal to the background service terminal by the communication module, and the background service terminal receives the second signal and sends a notification signal.

In order to identify a customer better, when the number of times that a frontal face has been detected by the customer identification module within a predetermined time reaches a threshold value, the detected face is identified as a customer's face, and then the first signal is sent to the control unit.

After the background service terminal sends the notification signal, the shopping guide robot is automatically linked with the background service terminal to establish a communication channel between a staff member and the customer.

Based on the customer's needs for commodities, the shopping guide robot is controlled to move to the region where the commodities are exhibited and indicate the locations of the commodities.

In another embodiment of the present invention, the body of the shopping guide robot is further provided with a human-computer interaction unit, and when the human-computer interaction unit is triggered, the control unit sends a signal to the background service terminal by the communication module; the background service terminal sends the notification signal after receiving the signal; and the human-computer interaction unit provides a touch panel or a call button.

Preferably, the shopping guide robot communicates with the background service terminal via a wired or wireless network.

The present invention also provides a customer identification notification method of a shopping guide robot provided with a control unit, a communication module, a camera unit and a customer identification module, and the method comprises the following steps:

S1: the camera unit captures images and sends face images to the face identification module;

S2: the customer identification module determines whether a face in the face images is a customer's face; if yes, the customer identification module sends a first signal to the control unit, and the control unit receives the first signal and then sends a second signal to the background service terminal by the communication module; and if not, return to S1; and S3: the background service terminal sends a notification signal after receiving the second signal.

In order to facilitate the communications or interactions between the customer and the staff members, after S3, further comprising:

S31: after the background service terminal receives the second signal and then sends the notification signal, the shopping guide robot automatically links with the background service terminal to establish a communication channel between the staff member and the customer.

Preferably, after S3, further comprising:

S4: the staff member operates the background service terminal to control the movement unit via the control unit so as to drive the shopping guide robot to move; and based on the customer's needs for commodities, controls the shopping guide robot to move to the region where the commodities are exhibited and indicate the locations of the commodities.

In S2, specifically, the customer identification module determines whether or not a face in the images is a customer's face by identifying the detected face as a customer's face when the number of times that a frontal face has been detected within a predetermined time has reached a threshold value.

In the shopping guide robot and the customer detection method of the shopping guide robot of the present invention, with a customer prompting system, the background staff no longer needs to stare at the monitor screen all the time to check if there is a customer in need of service, and the background system can automatically prompt that if any customer enters or needs help, reducing work strength.

Hereinafter, the technical solutions of the present invention will be described in detail with reference to the accompanied drawings and specific embodiments.

DESCRIPTION OF ATTACHED DRAWINGS

DETAILED DESCRIPTION OF PREFERRED EMBODIMENTS

First Embodiment

Figure 1:
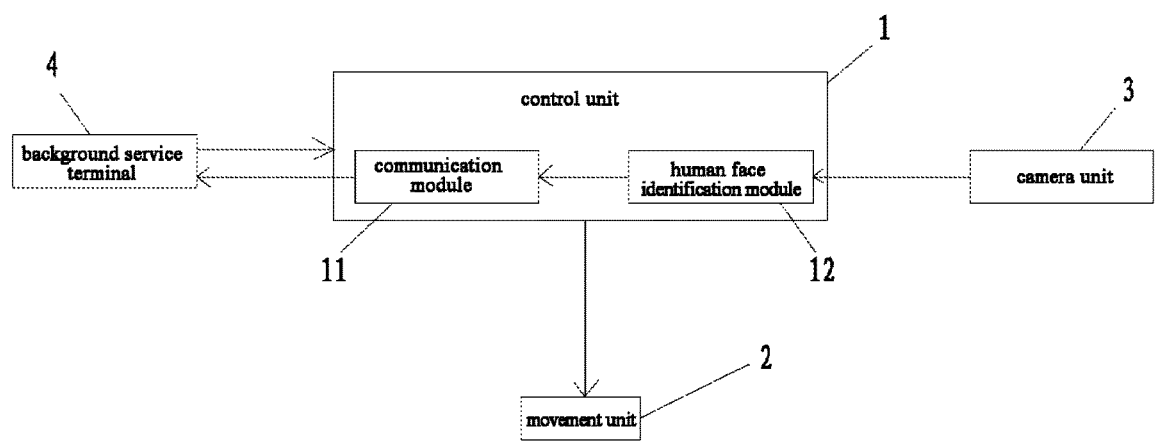
FIG. 1 is a block diagram illustrating the control of a shopping guide robot system according to the first embodiment of the present invention.

FIG. 1 is a block diagram illustrating the control of a shopping guide robot system according to the first embodiment of the present invention. As shown in FIG. 1, the present embodiment provides a background service terminal 4 and a shopping guide robot with a control unit 1, a movement unit 2 and a camera unit 3 for capturing images. In order to identify a customer better and more quickly, the control unit 1 is further provided with a customer identification module 12 to recognize faces in an image. During the identification, if it has been identified that the recognized face is the face of a customer in need of help, the customer identification module 12 sends a first signal to the control unit 1, and the control unit 1 sends a second signal to the background service terminal 4 via the communication module 11 after receiving the first signal. The background service terminal 4 receives the second signal and then sends a notification signal, by which the background staff could be aware of the entering of a customer and provide service timely. In the present embodiment, the communication unit 11 is provided in the control unit 1, however, the communication unit 11 could be provided outside the control unit 1. That is, the position of the communication unit 11 can be determined by the skilled in the art as desired.

In the actual shopping occasion, if a person constantly faces the camera with his/her frontal face, it is quite possible that the person is a potential customer. In the present invention, when the number of times that the frontal face has been detected by the customer identification module 12 within a predetermined time reaches a threshold value, the detected face is identified as a customer's face, and then a first signal is sent to the control unit 1 by the customer identification module 12. The customer identification module 12 may adopt various established algorithms to recognize faces in a image, such as Adaboost algorithm (Adaboost is an iterative algorithm, and the core concept thereof is to train different classifiers (weak classifier) for the same training set, then gather these weak classifiers together to form a stronger final classifier (strong classifier)), template matching model and singular value feature-based method. For example, if a frontal face is detected by the customer identification module 12 ten times within 300 ms-1000 ms, the detected face is identified as a customer's face. Furthermore, the customer identification module 12 can perform image comparison. If the proportion of a frontal face in an image gradually becomes larger and larger, which indicates that a customer is getting closer to the camera, the detected face is also determined as a customer.

When the customer identification module 12 determines that there is a customer, after the background service terminal 4 sends a notification signal, the shopping guide robot is automatically linked with the background service terminal 4 to establish a communication channel between the staff member and the customer so as to facilitate the communication between the staff member and the customer. The communication channel may be an interface display channel between the background service terminal and the shopping guide robot, or may be a voice communication channel. Moreover, after the establishment of the communication channel, according to the customer's needs for commodities, the staff member may control the shopping guide robot to move to the region where the commodities are exhibited, and to indicate the specific locations of the commodities. In the present embodiment, in order to facilitate the movement of the shopping guide robot, the shopping guide robot communicates with the background service terminal 4 via a wired or wireless network.

Figure 2:
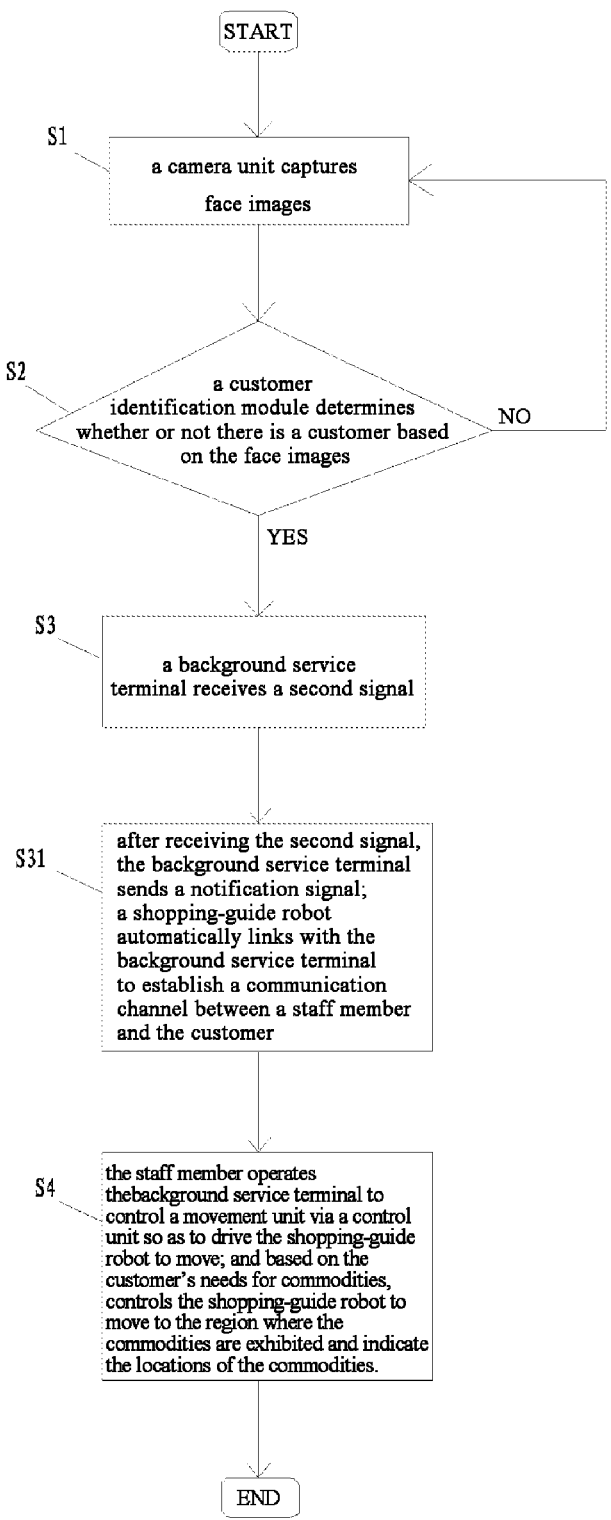
FIG. 2 is a logic diagram illustrating steps of a customer detection method of the shopping guide robot according to the first embodiment of the present invention.

FIG. 2 is a logic diagram illustrating steps of a customer detection method of the shopping guide robot according to the first embodiment of the present invention. As shown in FIG. 2, the shopping guide robot of the present embodiment is provided with a control unit 1, a communication module 11, a camera unit 3 and a customer identification module 12, and the customer detection method thereof comprises the following steps:

S1: the camera unit 3 captures face images, and sends the face images to the face identification module 12;

S2: the customer identification module 12 determines whether or not there is a customer in need of help based on the face images; if there is a customer in need of help, the customer identification module 12 sends a first signal to the control unit 1, and the control unit 1 receives the first signal and then sends a second signal to the background service terminal 4 via the communication module 11; and if not, return to S1; wherein, in the process of determining whether or not a face in the images is a customer's face by the customer identification module 12, when the number of times that a frontal face has been detected within a predetermined time reaches a threshold value, the detected face will be identified as a customer's face; and S3: the background service terminal 4 sends a notification signal after receiving the second signal.

After S3, a further step may be included to facilitate the communications or interactions between the customer and the staff member:

S31: after the background service terminal 4 receives the second signal and then sends the notification signal, the shopping guide robot automatically links with the background service terminal 4 to establish a communication channel between the staff member and the customer.

If the customer needs the locations of commodities, the following step is further comprised after S3:

S4: the staff member operates the background service terminal 4 to control the movement unit 2 via the control unit 1 so as to drive the shopping guide robot to move; and based on the customer's needs for commodities, controls the shopping guide robot to move to the region where the commodities are exhibited and indicate the locations of the commodities.

Second Embodiment

Figure 3:
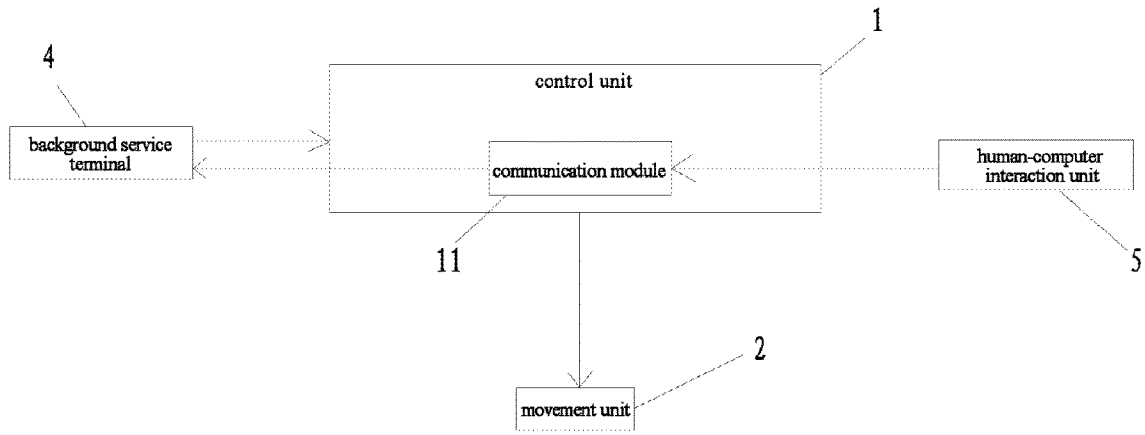
FIG. 3 is a block diagram illustrating the control of a shopping guide robot system according to the second embodiment of the present invention.

FIG. 3 is a control block diagram of a shopping guide robot system according to the second embodiment of the present invention. As shown in FIG. 3, the shopping guide robot of the present embodiment has a substantially same structure as that in the shopping guide robot system in the first embodiment, except that the body of the shopping guide robot according to the second embodiment is further provided with a human-computer interaction unit 5, which could be a touch panel or a call button. In the case of call button, when the customer operates the call button, the control unit 1 sends a signal to the background service terminal 4 by the communication module 11, and after the background service terminal 4 receives the signal and then sends a notification signal, the shopping guide robot is automatically linked with the background service terminal 4 to establish a communication channel between the staff member and the customer so as to facilitates the communication between the staff member and the customer. The communication channel may be an interface display channel of the background service terminal and the shopping guide robot, or may be a voice communication channel. After the establishment of the communication channel, according to the customer's needs for commodities, the staff member may control the shopping guide robot to move to the region where the commodities are exhibited, and to indicate the specific locations of the commodities. In the present embodiment, instead of using the camera unit 3 to capture images, the customer may directly press the call button to call the background service terminal.

Figure 4:
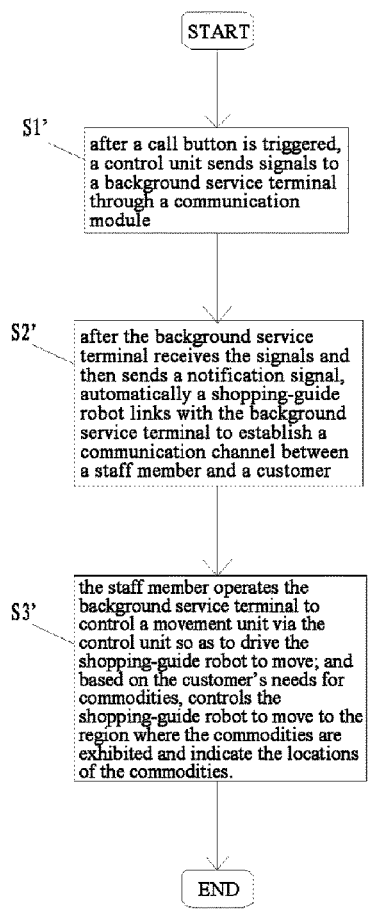
FIG. 4 is a logic diagram illustrating steps of a customer detection method of the shopping guide robot according to the second embodiment of the present invention.

FIG. 4 is logic diagram illustrating steps of a customer detection method of the shopping guide robot according to the second embodiment of the present invention. As shown in FIG. 4, in the present embodiment, the shopping guide robot is provided with a communication module 11 and a call button, and the customer detection method thereof comprises the following steps:

S1': after the human-computer interaction unit is triggered, the communication module 11 sends signal to the background service terminal 4 by the control unit 1;

S2': after the background service terminal 4 receives the signal and then sends a notification signal, automatically the shopping guide robot links with the background service terminal 4 to establish a communication channel between the staff member and the customer; and S3': the staff member operates the background service terminal 4 to control the movement unit 2 via the control unit 1 so as to drive the shopping guide robot to move; and based on the customer's needs for commodities, controls the shopping guide robot to move to the region where the commodities are exhibited and indicate the locations of the commodities.

In the shopping guide robot and the customer detection method of the shopping guide robot of the present invention, with a customer prompting system, the background staff no longer needs to stare at the monitor screen all the time to check if there is a customer in need of service, and the background system can automatically prompt that if any customer enters or needs help, reducing work strength.

The invention claimed is:

1. A shopping guide robot system comprising:
a shopping guide robot and a background service terminal, wherein a body of the shopping guide robot is provided with a control unit, a movement unit, a communication module and a camera unit for capturing images, wherein,
the control unit is provided with a customer identification module used to identify faces in an image, and the customer identification module sends a first signal after identifying that a face is a customer's face;
the control unit receives the first signal and sends a second signal to the background service terminal by the communication module, the second signal instructing the background service terminal to send a notification signal.

2. The shopping guide robot system of claim 1, wherein, when the number of times that a frontal face has been detected by the customer identification module within a predetermined time reaches a threshold value, the customer identification module identifies the detected face as the customer's face, and sends the first signal to the control unit.

3. The shopping guide robot system of claim 2, wherein,
after the background service terminal sends the notification signal, the shopping guide robot is automatically linked with the background service terminal to establish a communication channel between a staff member and the customer.

4. The shopping guide robot system of claim 1, wherein,
after the background service terminal sends the notification signal, the shopping guide robot is automatically linked with the background service terminal to establish a communication channel between a staff member and the customer.

5. The shopping guide robot system of claim 4, wherein,
based on the customer's needs for commodities, the shopping guide robot is controlled to move to a region where the commodities are exhibited and indicate locations of the commodities.

6. The shopping guide robot system of claim 5,
wherein,
based on the customer's needs for commodities, the shopping guide robot is controlled to move to a region where the commodities are exhibited and indicate locations of the commodities.

7. The customer identification notification method of claim 6, wherein,
in step S2, in the process of determining whether or not a face in the images is a customer's face by the customer identification module, when the number of times that a frontal face has been detected within a predetermined time reaches a threshold value, the detected face will be identified as the customer's face.

8. The shopping guide robot system of claim 1, wherein, the body of the shopping guide robot is further provided with a human-computer interaction unit, and when the human-computer interaction unit is triggered, the control unit sends a signal to the background service terminal by the communication module; the background service terminal sends the notification signal after receiving the signal; and the human-computer interaction unit provides a touch panel or a call button.

9. The shopping guide robot system of claim 1, wherein, the shopping guide robot communicates with the background service terminal via a wired or wireless network.

10. A customer identification notification method of a shopping guide robot provided with a control unit, a communication module, a camera unit and a customer identification module, characterized in that, comprising the following steps:

S1: the camera unit captures images and sends face images to the face identification module;

S2: the customer identification module determines whether a face in the face images is a customer's face; if yes, the customer identification module sends a first signal to the control unit, and the control unit receives the first signal and then sends a second signal to the background service terminal by the communication module, the second signal instructing the background service terminal to send a notification signal; and if not, the method returns to S1.

11. The customer identification notification method of the shopping guide robot of claim 10, further comprising, after S2:

S21: after the background service terminal receives the second signal and then sends the notification signal, the shopping guide robot automatically links with the background service terminal to establish a communication channel between staff member and the customer.

12. The customer identification notification method of the shopping guide robot of claim 10, further comprising, after S2:

S3: the staff member operates the background service terminal to control the movement unit via the control unit so as to drive the shopping guide robot to move; and based on the customer's needs for commodities, controls the shopping guide robot to move to a region where the commodities are exhibited and indicate the locations of the commodities.

13. The customer identification notification method of claim 12, wherein, in step S2, in the process of determining whether or not a face in the images is a customer's face by the customer identification module, when the number of times that a frontal face has been detected within a predetermined time reaches a threshold value, the detected face will be identified as the customer's face.

14. The customer identification notification method of the shopping guide robot of claim 13, further comprising, after S2:

S3: the staff member operates the background service terminal to control the movement unit via the control unit so as to drive the shopping guide robot to move; and based on the customer's needs for commodities, controls the shopping guide robot to move to a region where the commodities are exhibited and indicate the locations of the commodities.

* * * * *